(12) United States Patent
Klein et al.

(10) Patent No.: US 10,380,566 B2
(45) Date of Patent: Aug. 13, 2019

(54) AUTOMATED BANKING MACHINE AND RELATED METHODS

(71) Applicant: Diebold, Incorporated, North Canton, OH (US)

(72) Inventors: Alex Klein, Cuyahoga Falls, OH (US); Matt Zaugg, Monroe Falls, OH (US); Brian Block, North Canton, OH (US)

(73) Assignee: Diebold Nixdorf Incorporated, North Canton, OH (US)

( * ) Notice: Subject to any disclaimer, the term of this patent is extended or adjusted under 35 U.S.C. 154(b) by 439 days.

(21) Appl. No.: 15/333,141

(22) Filed: Oct. 24, 2016

(65) Prior Publication Data

US 2017/0103372 A1    Apr. 13, 2017

Related U.S. Application Data

(63) Continuation-in-part of application No. 15/288,593, filed on Oct. 7, 2016.

(60) Provisional application No. 62/239,589, filed on Oct. 9, 2015, provisional application No. 62/246,038, filed on Oct. 24, 2015.

(51) Int. Cl.
*G06Q 20/10* (2012.01)
*G07F 19/00* (2006.01)
*G06Q 20/40* (2012.01)

(52) U.S. Cl.
CPC ....... *G06Q 20/1085* (2013.01); *G06Q 20/405* (2013.01); *G06Q 20/40145* (2013.01); *G07F 19/203* (2013.01); *G07F 19/2055* (2013.01)

(58) Field of Classification Search
CPC .................................................. G06Q 20/1085
USPC .............................. 235/379; 705/43, 44, 72
See application file for complete search history.

(56) References Cited

U.S. PATENT DOCUMENTS

| | | | |
|---|---|---|---|
| 5,064,999 A | 11/1991 | Okamoto et al. | |
| 7,610,215 B1 | 10/2009 | Folk et al. | |
| 8,881,977 B1 * | 11/2014 | Paczkowski | ....... G06Q 20/1085 235/379 |
| 9,311,632 B1 * | 4/2016 | Dent | .................. G06Q 20/1085 |
| 2004/0237006 A1 | 11/2004 | Adkisson et al. | |
| 2004/0243515 A1 | 12/2004 | Kurihara et al. | |
| 2007/0011261 A1 * | 1/2007 | Madams | ............... H04L 63/083 709/207 |
| 2011/0016047 A1 | 1/2011 | Wu et al. | |
| 2011/0213709 A1 * | 9/2011 | Newman | ................. G06F 21/32 705/44 |
| 2012/0197797 A1 | 8/2012 | Grigg et al. | |
| 2012/0239579 A1 * | 9/2012 | Wolfs | ..................... G06Q 20/18 705/72 |

(Continued)

FOREIGN PATENT DOCUMENTS

| | | |
|---|---|---|
| EP | 1134705 A2 | 9/2001 |
| GB | 2461781 | 1/2010 |

(Continued)

OTHER PUBLICATIONS

International Search Report and Written Opinion of International Searching Authority for corresponding PCT application.

(Continued)

*Primary Examiner* — Allyson N Trail
(74) *Attorney, Agent, or Firm* — Black, McCuskey, Souers & Arbaugh, LPA (57) ABSTRACT

An Automated Transaction Machine (ATM) includes a time limited secure transaction.

8 Claims, 7 Drawing Sheets

(56) References Cited

U.S. PATENT DOCUMENTS

2013/0073467 A1\* 3/2013 Underwood ....... G06Q 20/3223
                                                    705/71
2013/0124410 A1   5/2013 Kay et al.
2013/0238497 A1   9/2013 Ramachandran et al.
2015/0278818 A1\* 10/2015 Horgan ............. G06Q 20/4016
                                                    705/43
2016/0210624 A1\* 7/2016 Niu .................... G06K 9/00013

FOREIGN PATENT DOCUMENTS

| JP | 2005258745 | 9/2005 |
|---|---|---|
| WO | WO 99/28830 A1 | 6/1999 |
| WO | WO 2014/081282 A1 | 5/2014 |

OTHER PUBLICATIONS

International Search Report and Written Opinion of International Searching Authority for related PCT application.

\* cited by examiner

AUTOMATED BANKING MACHINE AND RELATED METHODS

CROSS-REFERENCE TO RELATED APPLICATIONS

This application is a CIP of and claims priority to and the benefit of U.S. patent application Ser. No. 15/288,593 filed 7 Oct. 2016 which claims priority to and the benefit of U.S. Provisional Patent Application No. 62/239,589 filed 9 Oct. 2015 and claims priority to and the benefit of U.S. Provisional Patent Application No. 62/246,038 filed 24 Oct. 2015, and this application also claims priority to and the benefit of U.S. Provisional Patent Application No. 62/246,038 filed 24 Oct. 2015, the contents of all of which are hereby incorporated by reference in their entirety.

BACKGROUND

This relates in general to automated transaction machines (ATMs). For example, such ATMs may include self-service financial transaction terminals for currency or cash dispensing, accepting, or recycling, which are sometimes referred to as "self-service terminals" or simply "terminals".

SUMMARY

This relates more specifically to an Automated Transaction Machine (ATM) that may include time limited secure transactions. For example, a secure financial transaction may be complete in 10 seconds or less. Such transactions may include cash dispensing.

Such transactions may require biometric authorization. As such, this also relates more specifically to an ATM that may include at least one biometric security component. For example, the component may be an iris scan.

Various aspects will become apparent to those skilled in the art from the following detailed description and the accompanying drawings.

DETAILED DESCRIPTION

Figure 1:
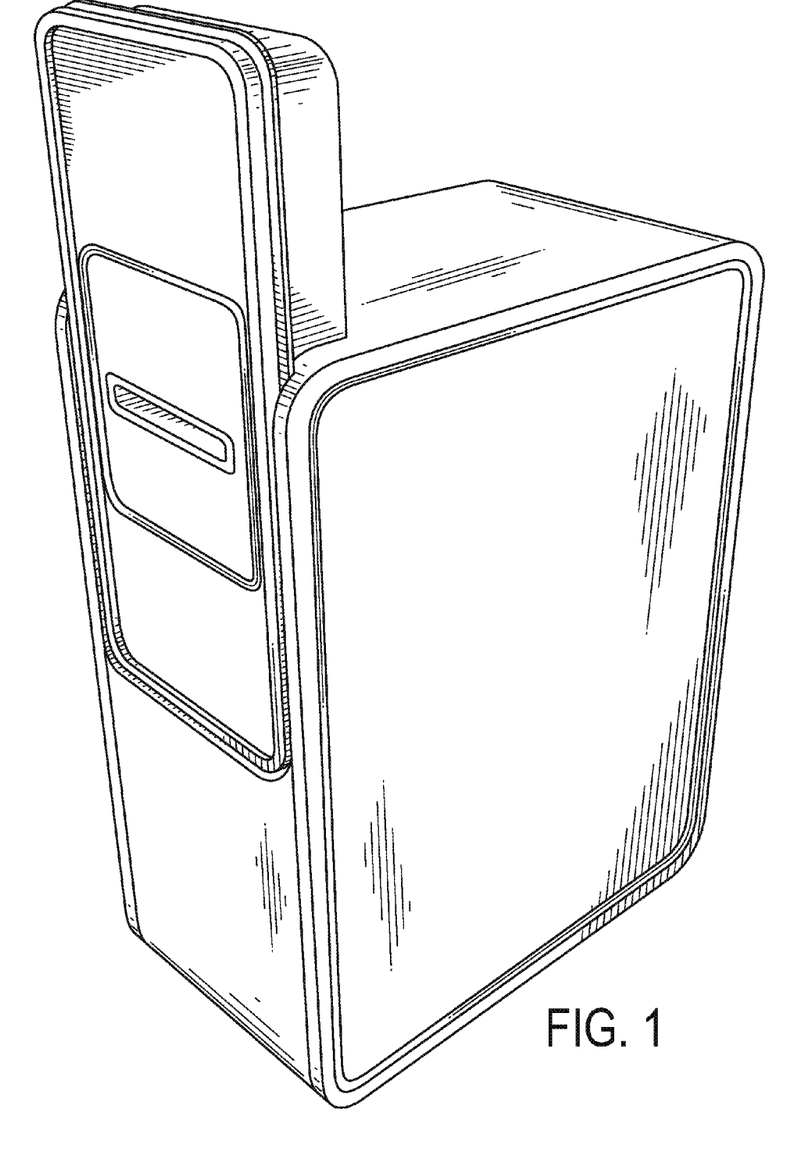
FIG. 1 is a right-front perspective view of an Automated Transaction Machine (ATM) according to one embodiment.
Figure 2:
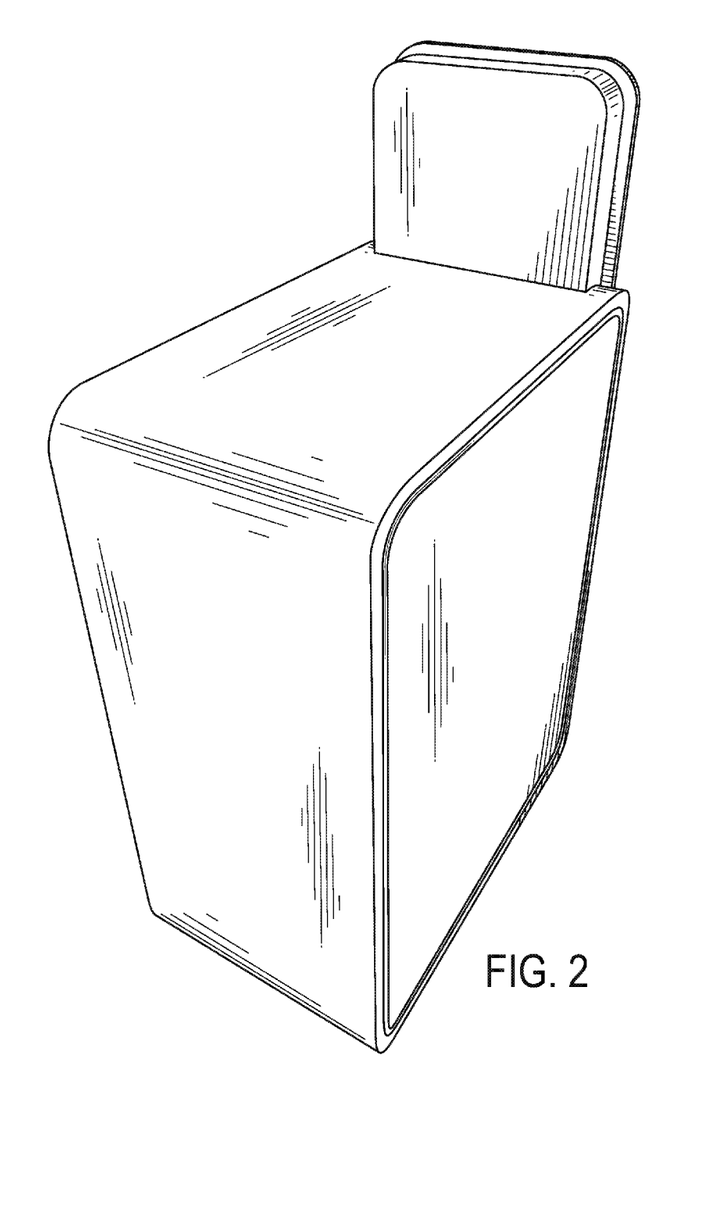
FIG. 2 is left-back perspective view of the ATM of FIG. 1.
Figure 3:
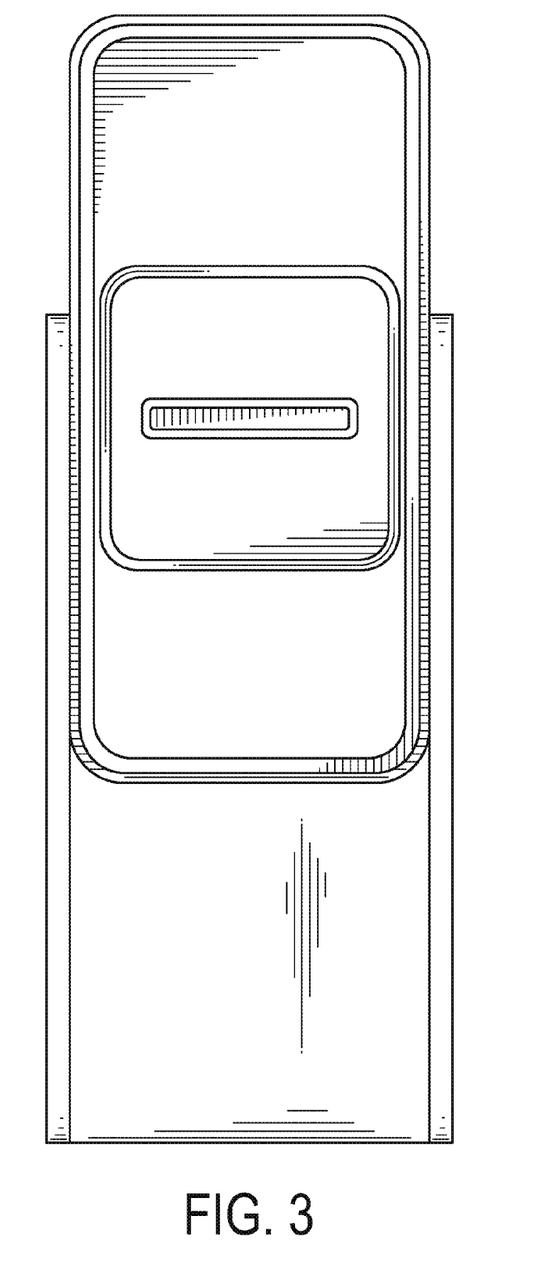
FIG. 3 is a front view of the ATM of FIG. 1.
Figure 4:
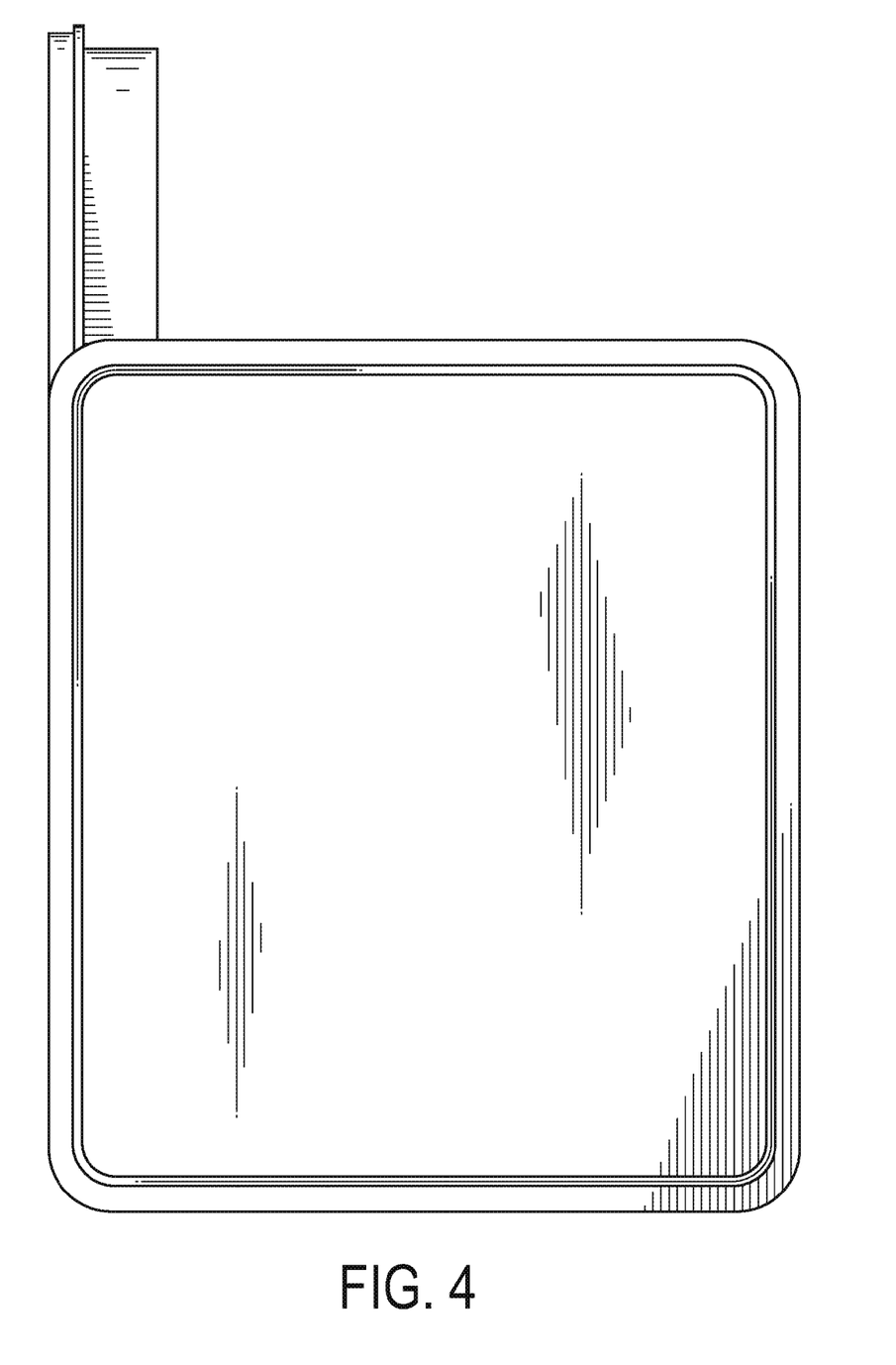
FIG. 4 is view of the right side of the ATM of FIG. 1.
Figure 5:
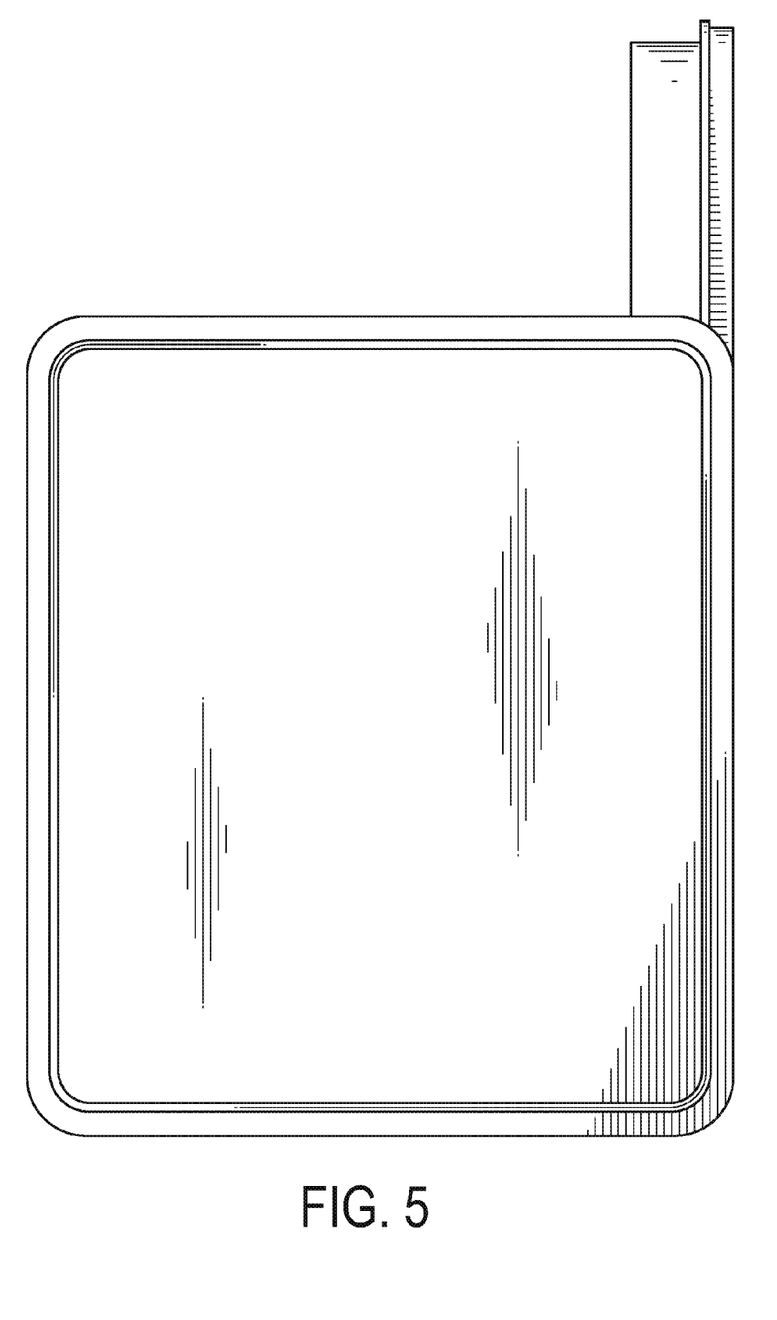
FIG. 5 is view of the left side of the ATM of FIG. 1.
Figure 6:
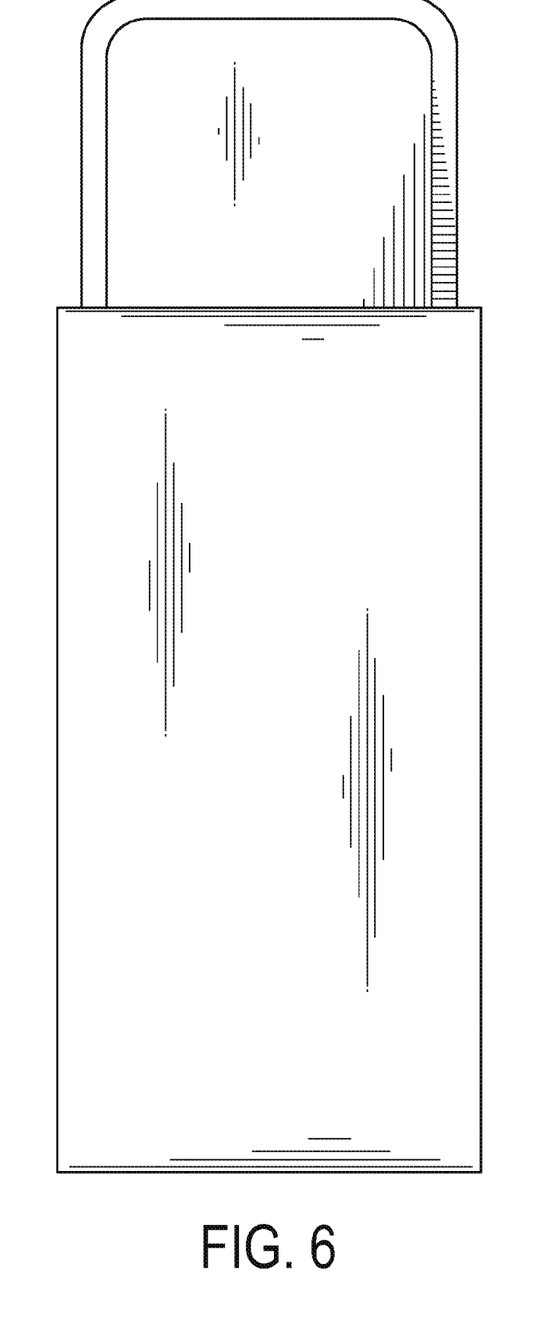
FIG. 6 is a back view of the ATM of FIG. 1.
Figure 7:
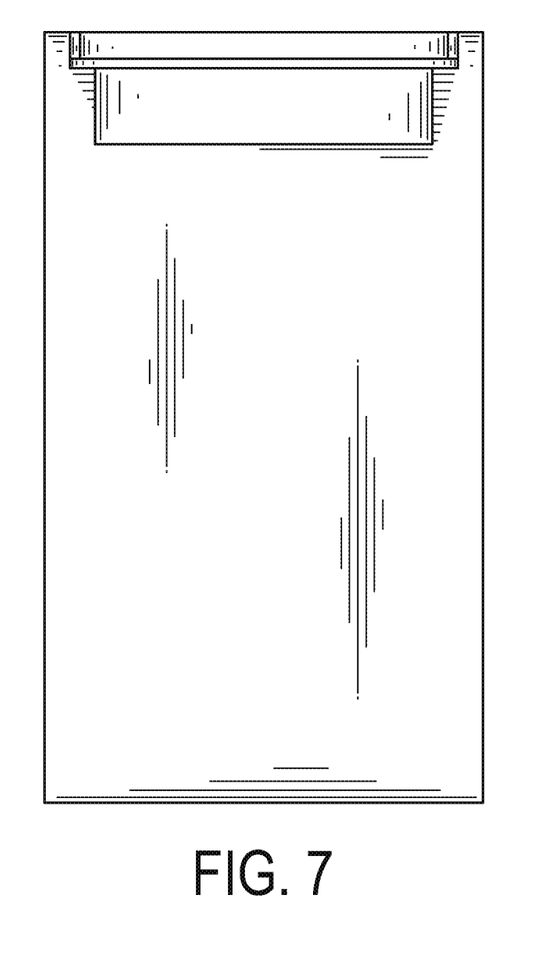
FIG. 7 is a top view of the ATM of FIG. 1.

Referring now to the drawings, there is illustrated in FIGS. 1-8, an Automated Transaction Machine (ATM). A housing or cabinet includes generally parallel side panels, a rear panel, a top panel, bottom panel, and a front fascia, which projects or extends from a front of the housing. The ATM may include a chest or safe in a lower portion, such as for example a UL 13 mm safe, with currency cassettes located within the chest or safe. Also located within the housing, preferably within an upper portion, are any of the devices and modules desired to carry out various self-service financial transactions for which the ATM is configured, including but not limited to card reading, PIN entry and verification, transaction request and approval, currency dispense by retrieval of notes from one or more cassettes, transport and presentation of currency to the customer (not all shown).

In at least one embodiment the ATM a computer to carry out transactions. Additionally the ATM may include a component(s) to dispense cash.

For further example, in at least one embodiment the AMT may include any one of an orifice through which cash may be dispensed; a wireless transmitter; a wireless receiver. The ATM may or may not include any of the following: a screen that is configured to display alphanumeric characters; a card reader operable to read card data that can be used to identify a financial account; a printer; a component configured to dispense paper receipts; and user-interface buttons.

In one method of operation of the ATM may include the steps of: an automated transaction machine receiving a wireless signal from a mobile device, wherein the automated transaction machine has a computer; a component configured to dispense cash; an orifice through which cash may be dispensed; a wireless transmitter; a wireless receiver;

The ATM may include time limited secure transactions. For example, a secure financial transaction may be complete in 10 seconds or less. Such a transaction may include cash dispensing.

The ATM may include at least one biometric security component. For example, the component may be an iris scanner or a fingerprint identifier.

In one embodiment the ATM includes a housing and a control electronics package disposed in the housing. The control electronics package includes a processor and a plurality of input/output ports. The control electronics package is operable to time limit a secure transaction of the ATM.

For example, the time limit of the secure transaction may be 10 seconds or less. The secure transaction may be cancelled if authorization is not received from a remote computer before the expiration of the time limit. The secure transaction may cancelled if authorization to proceed is not received from a remote computer, such as a server on the ATM network, a computer from a host bank, or other transaction authorizing compute before the expiration of the time limit. The secure financial transaction may conclude in cash dispensing.

The ATM may further include at least one biometric security component and a beginning of the time limit may begin with a transaction authorization related to activity from the biometric security component. The biometric security component may be an iris scanner, a finger print reader, or any other suitable component.

The time limit may begin with a request to a remote computer. The request may initiate after activity from the biometric security component. The secure transaction may be cancelled if authorization is not received from the remote computer before the expiration of the time limit.

While principles and modes of operation have been explained and illustrated with regard to particular embodiments, it must be understood, however, that this may be practiced otherwise than as specifically explained and illustrated without departing from its spirit or scope.

What is claimed is:

1. An Automated Transaction Machine (ATM) comprising:
   a housing; and
   a control electronics package disposed in the housing and including a processor and a plurality of input/output ports;
   where, the control electronics package is operable to read data from a card and receive a personal identification number (PIN) input and a cash dispense request from a user, transmit the data from the card and the PIN and the cash dispense request as a requested secure transaction to a remote computer for authorization of the requested secure transaction, and to time limit authorization of the requested secure transaction, wherein the time limit begins when the requested secure transaction is transmitted to the remote computer or before, and wherein the requested secure transaction is cancelled if the authorization is not received from the remote computer before the expiration of the time limit.

2. The ATM of claim 1 where the time limit is ten seconds or less such that the control electronics package cancels the requested secure transaction if the authorization is not received less than ten seconds from the start of the time limit.

3. The ATM of claim 1 further comprising:
at least one biometric security component, wherein the requested secured transaction includes biometric data received through the at least one biometric security component and the time limit begins with activity of the biometric security component.

4. The ATM of claim 3 where the biometric security component is further defined as an iris scan.

5. The ATM of claim 3 where the biometric security component is further defined as a finger print reader.

6. The ATM of claim 3 where the time limit is ten seconds or less such that the control electronics package cancels the requested secure transaction if the authorization is not received less than ten seconds from the start of the time limit.

7. The ATM of claim 1 where the time limit begins with the transmission of the requested secure transaction to the remote computer.

8. The ATM of claim 7 where the ATM further comprises:
at least one biometric security component, wherein the requested secured transaction includes biometric data received through the at least one biometric security component, and where the requested secure transaction is transmitted after the activity of the at least one biometric security component.

* * * * *